J. H. BAKER.
BOLSTER.
APPLICATION FILED JULY 15, 1909.
937,692.
Patented Oct. 19, 1909.
3 SHEETS—SHEET 1.
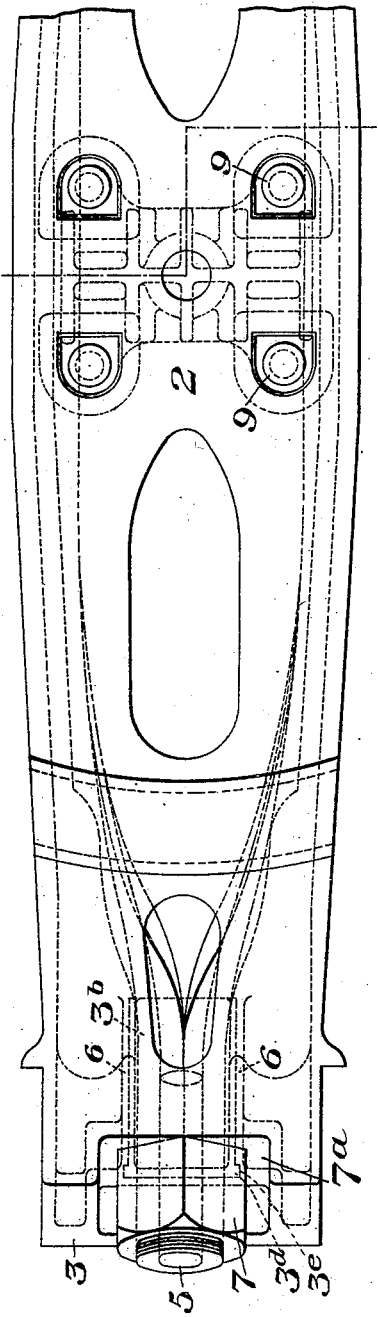
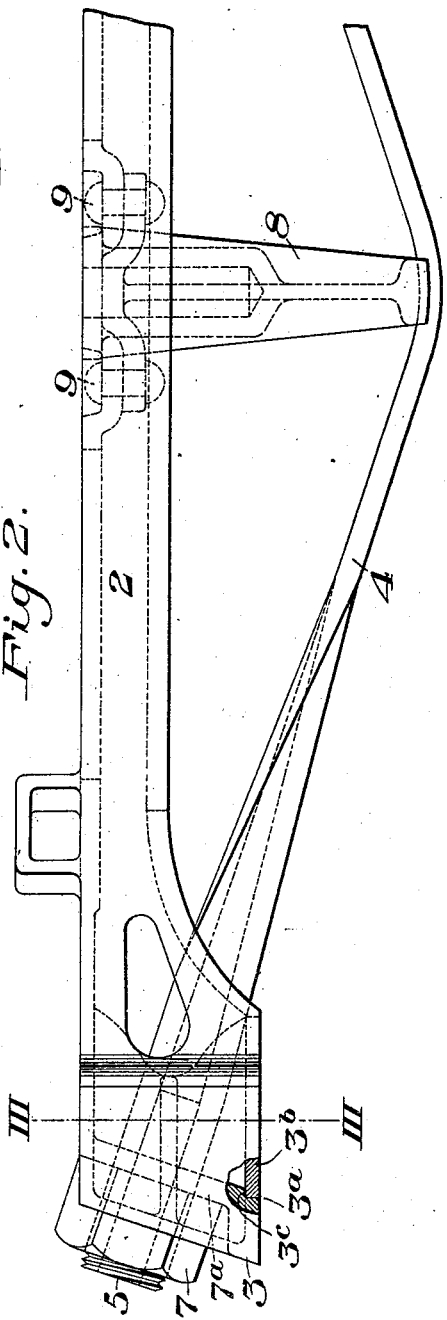

J. H. BAKER.
BOLSTER.
APPLICATION FILED JULY 15, 1909.
937,692.
Patented Oct. 19, 1909.
3 SHEETS—SHEET 2.
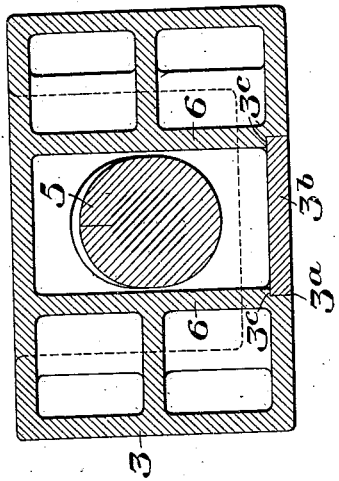
Fig. 3.
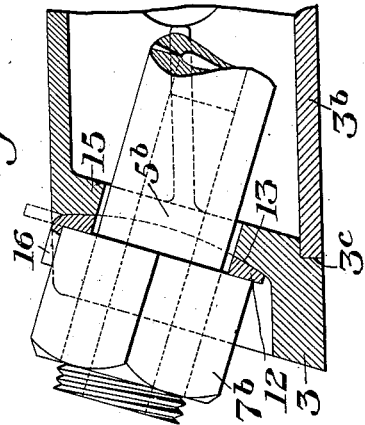
Fig. 8.
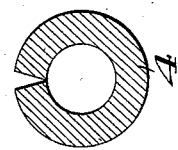
Fig. 5ª.
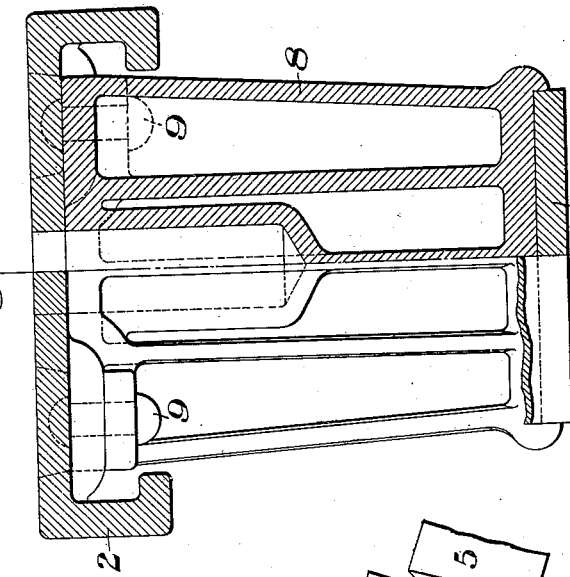
Fig. 4.
Fig. 5.
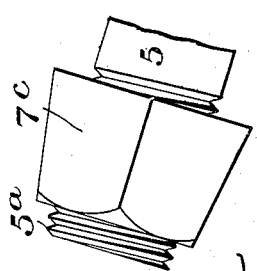
Fig. 9.
WITNESSES
R. A. Balderson
G. L. Winters.
INVENTOR
J. H. Baker,
by Bakewell, Byrnes & Parmelee,
his Attys J. H. BAKER.
BOLSTER.
APPLICATION FILED JULY 15, 1909.
937,692.
Patented Oct. 19, 1909.
3 SHEETS—SHEET 3.
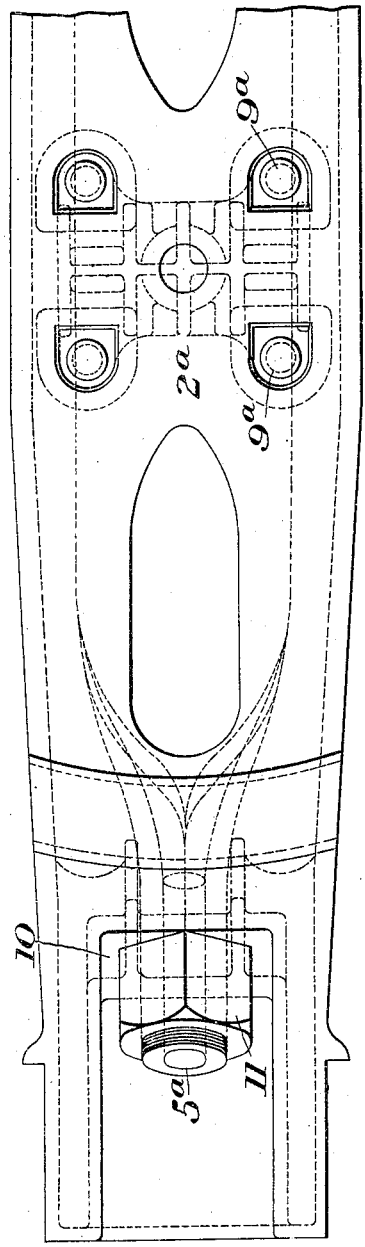
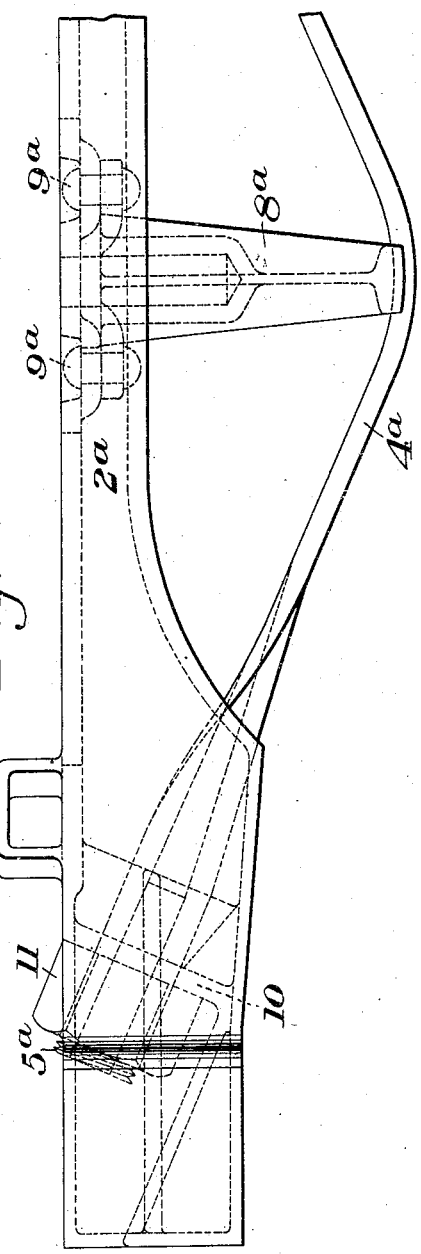
WITNESSES
INVENTOR

UNITED STATES PATENT OFFICE.

JAMES H. BAKER, OF PITTSBURG, PENNSYLVANIA.

BOLSTER.

937,692.  Specification of Letters Patent.  Patented Oct. 19, 1909.

Continuation of application Serial No. 451,978, filed September 8, 1908. This application filed July 15, 1909. Serial No. 507,700.

*To all whom it may concern:*

Be it known that I, JAMES H. BAKER, of Pittsburg, Allegheny county, Pennsylvania, have invented a new and useful Improvement in Bolsters, of which the following is a full, clear, and exact description, reference being had to the accompanying drawings, forming part of this specification, in which—

Figure 1 is a plan view, and Fig. 2 a side elevation of a portion of one form of bolster embodying my invention; Figs. 3 and 4 are detail sectional views taken on the lines III—III of Fig. 2 and IV—IV of Fig. 1; Figs. 5 and 5ᵃ are detail sectional views showing one way of reinforcing the ends of the tension member; Figs. 6 and 7 are views which are respectively similar to Figs. 1 and 2, but which show a modified construction; Fig. 8 is a detail view showing another modification; and Fig. 9 is a modified form of nut.

My invention has relation to car and truck bolsters and is designed to provide a simple and strong bolster which can be readily and cheaply manufactured.

In accordance with my invention, I construct the compression and tension members separately and provide a novel connection between the end portions of the two members. I also provide a novel construction of the tension member.

Referring to Figs. 1 and 2, wherein I have shown my invention as applied to one form of a truck bolster, the numeral 2 designates the compression member which is shown as a casting having a downwardly enlarged and flanged end portion at each end, such as shown at 3, these end portions being provided with oblique seats or walls through which extend the end portions of the tension member 4. This tension member preferably consists of a wrought or pressed metal shape having a substantially flat and relatively thin central portion which is narrowed toward its ends, the edges of the widened portions being gradually bent upwardly into trough form, as shown in Fig. 5, and then brought together, as shown in Fig. 5ᵃ, around a filler 5, which is welded within the end portions of the member 4. The end portions of the tension member are exteriorly threaded to receive the securing nuts 7, which seat against the inclined wall 7ᵃ. 8 designates the usual central post or strut, which is shown as formed separate from the compression member and is secured thereto in any suitable manner.

To facilitate the insertion and removal of the tension member, I preferably provide the end portions of the bolster with a bottom opening at 3ᵃ (Figs. 1, 2, 3 and 8), this opening being normally closed by a removable plate 3ᵇ. This plate seats upwardly against shoulders 3ᶜ provided in the ribs 6 and at the bottom of the inclined wall 7ᵃ. It may be held against longitudinal unseating movement by the lugs or projections 3ᵈ at one end portion which engage corresponding recesses 3ᵉ in the bottom wall of the end portion of the bolster.

It will be understood that the compression member may be formed in various ways, my invention not being limited to a cast compression member.

In the form of my invention shown in Figs. 6 and 7, the connection between the ends of the tension member 4ᵃ and the compression member 2ᵃ, instead of being made near the extreme ends of the compression member, as shown in Figs. 1 and 2, is made a short distance back from the ends, as shown, the compression member having the oblique interior wall 10, through which the ends 5ᵃ of the tension member extend and against which the securing nut 11 is seated.

In both the forms shown, the connections are sufficiently back from the ends of the compression member to be out of the way and to effect a very considerable saving of metal.

In the modification shown in Fig. 8, the wall 5ᵇ of the compression member has a curved outer surface and a washer 12, having a correspondingly curved face 13, which seats on the curved face of the wall and forms a bearing for the nut on the end of the tension member. The rocking washer takes care of variations in the direction of pull on the nut, and affords a secure bearing for the nut under all such variations. It also takes care of irregularities in the bearing surfaces of the parts. This washer is preferably fitted at its ends against the end walls 15 of the seat, so as to hold it from turning and is provided with one or more lips or flanges 16, which can be bent into locking engagement with the nut, as shown.

The nut 7ᶜ shown in Fig. 9 is provided with a tapered face, which reduces the weight without reducing its strength. This tapering of the nut also reduces the outer area thereof, and avoids bulkiness at the end of the bolt and nut.

By providing the ends of the tension member with fillers welded therein in the manner described, I am enabled to utilize the full tension strength of the tension member, since it will be apparent that the pull thereon will be in the line of the axis of the reinforced ends of said member. The connection is also an extremely simple one, which can be readily made, and this mode of fastening enables the compression member to be made of such shape and section that it can be readily cast. The cross sectional area of the reinforced portions of the tension member is substantially equal to the maximum cross sectional area of the said member. I do not, however, limit myself to this particular manner of reinforcing the tension member, since the fillers may be omitted, the folded edge portions thereof being upset sufficiently to provide the desired additional metal. Or, the tension member may be formed of a round rod, flattened at its central portion. This form of tension member gibes it a wide flat base for the strut to rest upon, thus giving lateral strength to the bolster, maintains the tensile strength in the ends equal to that of the center and so adapts the ends to go through the ends of the compression member without enlarging the bolster there, and further, the metal displaced to make room for the tension member comes out of the central or neutral part of the compression member.

Where the flat bar is used in unchanged form throughout the tension member, it necessitates building around the ends of the bolster to get proper bearings. And if a tension member round in section throughout of sufficient strength is used, it would bring the lines of strain in the compression and tension members much closer together as the depth of the bolster over all in the center is limited, and the closer these lines of strain are brought to each other, the heavier the members would have to be.

Various other changes can obviously be made in the details of construction and arrangement, without departing from the spirit and scope of my invention. It will also be readily seen that although I have shown and described the construction in connection with a truck bolster, the same method of construction may be followed for a body bolster.

I claim:—

1. A bolster consisting of a cast compression member and a wrought tension member of substantially flat and wide form at its central portion, the ends of the wrought member being extended obliquely upward through the end portions of the cast member and having cylindrical threaded end portions, and securing means engaging such end portions and having a bearing on the cast member in recesses in the end portions of said member; substantially as described.

2. A bolster comprising a compression member having enlarged flanged end portions provided with interior oblique walls, and a separate tension member having its ends extended obliquely upwardly through said walls and secured thereto, said tension member being of wide and substantially flat form at its central portion and having rounded end portions to receive the securing means; substantially as described.

3. A bolster comprising a cast compression member having an enlarged flanged end provided with an obliquely extending interior wall, a wrought tension member extending obliquely through said wall and having a threaded end portion, and a nut engaging the threaded end portion and seating against the wall, said tension member being of wide and substantially flat form throughout its central portion, and having its end portions rounded for the threads and nuts; substantially as described.

4. A bolster comprising a compression member having an enlarged portion provided with an oblique wall and a separate tension member extending obliquely upwardly through said wall and secured thereto, said tension member having its end portion reinforced by a filler welded thereto; substantially as described.

5. A bolster having a compression member provided with an enlarged end portion having an interior wall, and a tension member having a relatively wide and flat central portion and rounded and threaded end portions secured to the end portion of the compression member by a nut seating against said wall, substantially as described.

6. In a bolster, a compression member having an interior oblique wall and a tension member having its edges bent around and welded to a short filler, said tension member having its end portion so formed extending obliquely through said wall, and a nut engaging the threaded end of the said member and seated against the said wall, substantially as described.

7. A trussed bolster having its compression members provided with an oblique wall, and its tension member having an end portion extending obliquely through said wall, and a nut on the end of the last named member and having a rocking bearing on said wall; substantially as described.

8. A trussed bolster having the ends of its tension member extending obliquely through the end portions of the compression member and having threaded nut-seating ends, bearings for said nuts, and washers interposed between the nuts and their seats and capable of a rocking movement thereon to permit adjustment to variations in the direction of pull on the nut; substantially as described.

9. A trussed bolster having the ends of its tension member extending obliquely through the end portions of the compression member and having threaded nut-seating ends, bearings for said nuts, and washers interposed between the nuts and their seats, said washers and the bearings having interfitted curved bearing surfaces to permit an adjustment of the washer relatively to the seat; substantially as described.

10. A trussed bolster having the ends of its tension member extending obliquely through the end portions of the compression member, and having threaded nut-seating ends, bearings for said nuts, washers interposed between the nuts and their seats, and capable of a rocking movement thereon to permit adjustment to variations in the direction of pull on the nut, and means for locking the nuts; substantially as described.

11. In a bolster, a tension member having a substantially flat and relatively thin central portion, and narrowed end portions which are rounded and threaded to receive securing nuts; substantially as described.

12. A bolster, having the ends of its tension member extending obliquely through the end portions of the compression member, securing means engaging the end portions of the tension member and having a bearing on the compression member in the end portions of the latter, said end portions having a bottom opening to facilitate the insertion and removal of the tension member; substantially as described.

13. A bolster, having the ends of its tension member extending obliquely through the end portions of the compression member, securing means engaging the end portions of the tension member and having a bearing on the compression member in the end portions of the latter, said end portions having a bottom opening to facilitate the insertion and removal of the tension member, together with means for normally closing such openings; substantially as described.

In testimony whereof, I have hereunto set my hand.

JAMES H. BAKER.

Witnesses:
Geo. H. Parmelee,
H. M. Corwin.